United States Patent [19]

De Coster et al.

[11] Patent Number: 5,176,329
[45] Date of Patent: Jan. 5, 1993

[54] CONDIMENT GRINDER

[75] Inventors: Pieter K. J. De Coster, Aalst; Guido O. De Mey, Burst, both of Belgium

[73] Assignee: Dart Industries Inc., Deerfield, Ill.

[21] Appl. No.: 818,942

[22] Filed: Jan. 10, 1992

[51] Int. Cl.5 .............................. A47J 42/04
[52] U.S. Cl. ................. 241/169.1; 241/259; 241/259.1
[58] Field of Search ............. 241/169.1, 168, 258, 241/259, 259.1

[56] References Cited

U.S. PATENT DOCUMENTS

| 218,627 | 8/1879 | Hasdenteufel | 241/168 X |
|---|---|---|---|
| 595,481 | 12/1897 | Jenatschke et al. | 241/169.1 X |
| 2,407,808 | 9/1946 | Bivans | 241/169.1 X |
| 2,507,670 | 5/1950 | Jatkoe et al. | 241/169.1 |
| 2,688,448 | 9/1954 | Lenz | 241/169.1 |
| 2,974,887 | 3/1961 | Grandinetti | 241/168 X |
| 3,168,256 | 2/1965 | Bounds et al. | 241/169.1 |
| 4,634,061 | 1/1987 | Williams | 241/259.1 X |
| 4,685,627 | 8/1987 | Lee | 241/169.1 |
| 4,771,955 | 9/1988 | Paulson | 241/169.1 |
| 4,865,258 | 9/1989 | Smith et al. | 241/169.1 |
| 4,960,246 | 10/1990 | Fohrman | 241/169.1 |

FOREIGN PATENT DOCUMENTS

| 1165214 | 3/1964 | Fed. Rep. of Germany | 241/169.1 |
|---|---|---|---|
| 2747059 | 5/1979 | Fed. Rep. of Germany | 241/169.1 |
| 2499840 | 8/1982 | France | 241/169.1 |

Primary Examiner—Douglas D. Watts
Assistant Examiner—Clark F. Dexter
Attorney, Agent, or Firm—John A. Doninger

[57] ABSTRACT

A condiment grinder including a grinding mechanism with an adjustment shaft extending therefrom and mounting both a positioning ring for rotational driving of the shaft and an adjustment nut for longitudinal adjustment of the shaft and the coarseness of the grind. A single knob engages the positioning ring and adjustment nut for simultaneous rotational driving of the positioning ring and nut, and for independent rotation of the adjustment nut to effect control of the operation of the grinder with a single knob.

19 Claims, 5 Drawing Sheets

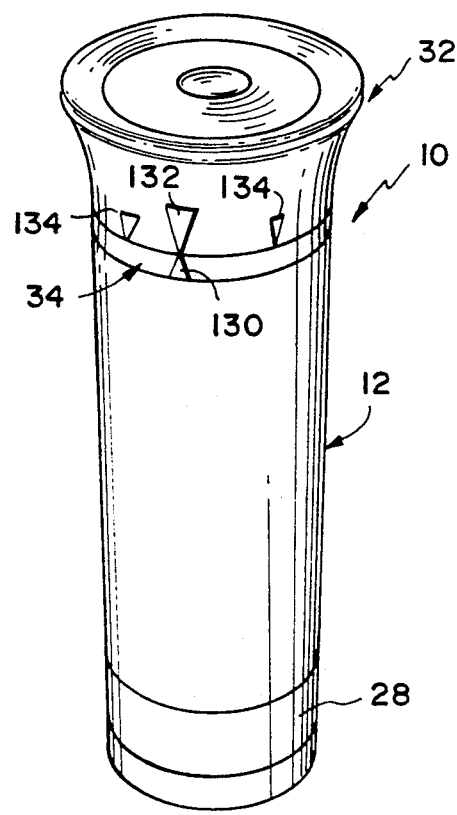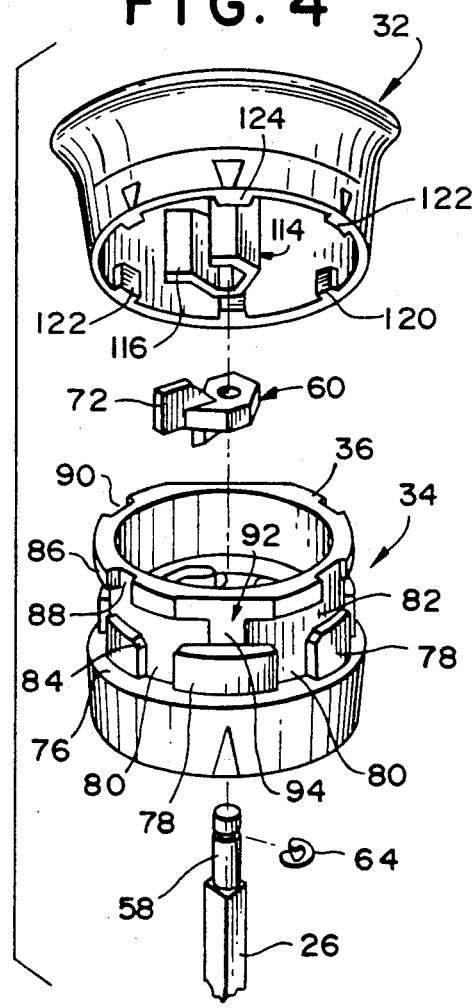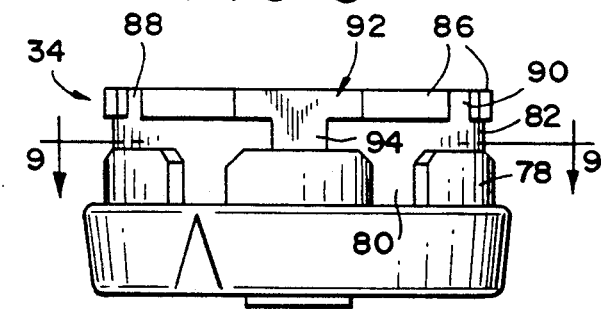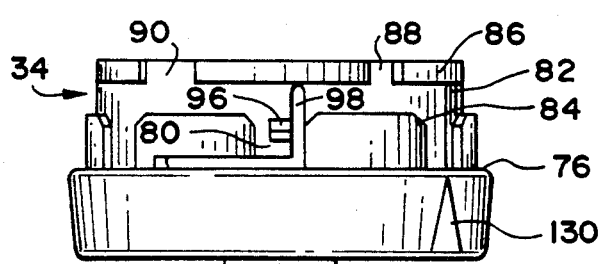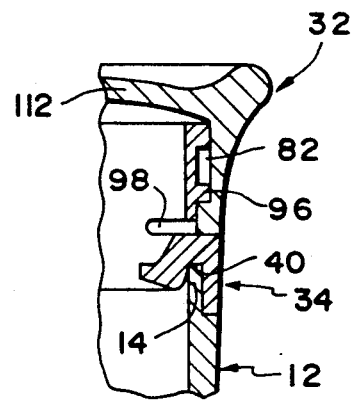

CONDIMENT GRINDER

BACKGROUND OF THE INVENTION

The present invention is generally concerned with a dispenser for condiments, most usually pepper, which receives and stores the condiment as bulk particles, for example peppercorns, for selective grinding and dispensing.

The typical grinder/dispenser includes a hollow elongate container with a grinding mechanism at the lower discharge end thereof. The grinding mechanism is adjustable to vary the coarseness of the ground pepper or other condiment as it is dispensed. The adjustment of the grinder mechanism is usually effected by a nut-controlled manipulation of an elongate shaft extending through the container and engaged, at the lower end thereof, with the internal grinding component of the grinder mechanism. The shaft, at the upper end thereof, mounts the adjustment nut which is normally exposed for direct manual manipulation. The conventional adjusting nut has a low pitch and requires multiple revolutions thereof in order to achieve the full range of adjustment of a conventional grinder mechanism, that is from fine to coarse. As such, the particular coarseness desired is usually a matter of trial and error with each adjustment being followed by at least a partial dispensing to determine the coarseness.

Pepper grinders are also known wherein the adjustment nut or equivalent means are concealed during the use of the device as a dispenser. However, such adjustment means are not accessible or operable in the concealed position, but rather, must be exposed for subsequent adjustment.

The known salt, pepper or general purpose condiment grinders, as suggested above, require separate means for effecting the coarseness adjustment and for the actual grinding and dispensing, with the separate means being separately accessed and manipulated.

SUMMARY OF THE INVENTION

The condiment grinder of the present invention recognizes deficiencies in conventional condiment grinders, of the type normally used for table service, and uniquely overcomes such deficiencies.

More particularly, the grinder of the invention, incorporating a conventional bottom-located grinding mechanism, has the coarseness thereof controlled by the adjustment of a concealed nut which, without exposure thereof, is manually adjustable from the exterior of the grinder. In conjunction with this adjustment, provision is made whereby a full range of adjustment of the mechanism is effected by a rotation of the adjustment nut through less than a full revolution, that is less than 360°, whereby, and with appropriate guide markings, the desired coarseness of the grind can be set in an exact manner and not on a trial and error basis such as arises in those instances wherein the adjustment nut is required to travel beyond, and normally well beyond, a single 360° revolution.

It is also a significant object of the invention to provide a condiment grinder wherein all of the functional adjustments and manipulations thereof, including the adjustment of the coarseness of the grind and the actual grinding and dispensing of the condiment, are effected by the manipulation of a single external manually graspable knob or cover.

In order to achieve the advantages sought by the present invention, the grinder, provided with a conventional grinding mechanism at the lower end of a container unit, includes an elongate central bar or shaft extending from the grinding mechanism, and a positioning ring rotatably mounted over the open upper end of the container and keyed to the shaft for rotation of the shaft in response to rotation of the ring. The rotation of the shaft effects the grinding and dispensing action of the grinding mechanism.

A retaining nut is rotatably mounted on the shaft above the positioning ring. The lower face of the nut defines a high pitch helical cam follower engaged with an upwardly directed similar high pitch helical cam surface on the positioning ring whereby rotation of the nut relative to the shaft and positioning ring effects an effective longitudinal adjustment of the central shaft and a corresponding adjustment of the grinding mechanism and the coarseness of the condiment. The high pitch of the cam and cam follower provide for a full range of adjustment of the coarseness through less than a complete revolution of the nut.

A single manually manipulable control cover or knob mounts over the positioning ring and encloses and conceals the adjustment nut.

The positioning ring includes an upstanding wall which telescopically receives a depending skirt of the control knob thereabout. The knob includes inwardly directed lugs on the skirt which, upon a full downward seating of the knob, engage within vertical locking recesses in the outer surface of the wall and are rotatably retained therein between blocks formed to each side of the recesses whereby rotation of the knob will effect a corresponding rotation of the positioning ring to produce the grinding and dispensing. The knob includes a central panel overlying and concealing the adjustment nut. A depending sleeve integral with this panel is keyed to and vertically slidable on the nut for rotation of the nut in conjunction with rotation of the knob. With the knob fully seated on the positioning ring, rotation of the knob rotates the positioning ring through the engagement of the lugs within the recesses. The positioning ring, through engagement of the sleeve therewith, effects a corresponding rotation of the adjustment nut whereby the relationship between the nut and positioning ring is retained and there is no relative adjustment of the effective length of the central shaft. Hence, grinding is effected at a fixed coarseness.

The positioning ring immediately above the lower recesses, and at a second stage or adjusted position, includes a continuous annular recess or groove which receives the knob lugs and allows for a free rotation of the knob relative to the positioning ring. The knob sleeve remains in keyed engagement with the adjustment nut whereby rotation of the knob rotates the nut relative to the positioning ring and effects, through the camming surfaces, a longitudinal (i.e. axial) adjustment of the central grinding mechanism bar or shaft whereby an adjustment of the coarseness is achieved without dispensing.

The outer surface of the positioning ring wall, above the annular groove, is provided with a series of passages which extend from the groove to the top of the positioning ring whereby, upon an alignment of the knob lugs with the passages, the knob can be completely removed for the introduction of peppercorns or the like through the open top of the positioning ring which is itself in the nature of a spider supporting a central collar receiving the grinding mechanism shaft therethrough. The knob lugs and positioning ring passages are so sized as to guide the mounting of the knob for proper orientation thereof relative to the positioning ring.

Other features and advantages of the invention will become apparent from the more detailed description of the invention following hereinafter.

BRIEF DESCRIPTION OF THE DRAWINGS

FIG. 1 is a perspective view of the condiment grinder;

FIG. 4 is an exploded perspective view of the operating components at the upper end of the grinder;

FIG. 5 is an enlarged elevational view of the positioning ring;

FIG. 6 is a view of the positioning ring rotated at approximately 90°;

FIG. 10 is a cross-sectional detail through the control knob and positioning ring illustrating the releasable locking of the knob to the positioning ring for adjustment thereof;

DESCRIPTION OF THE PREFERRED EMBODIMENTS

Figure 2:
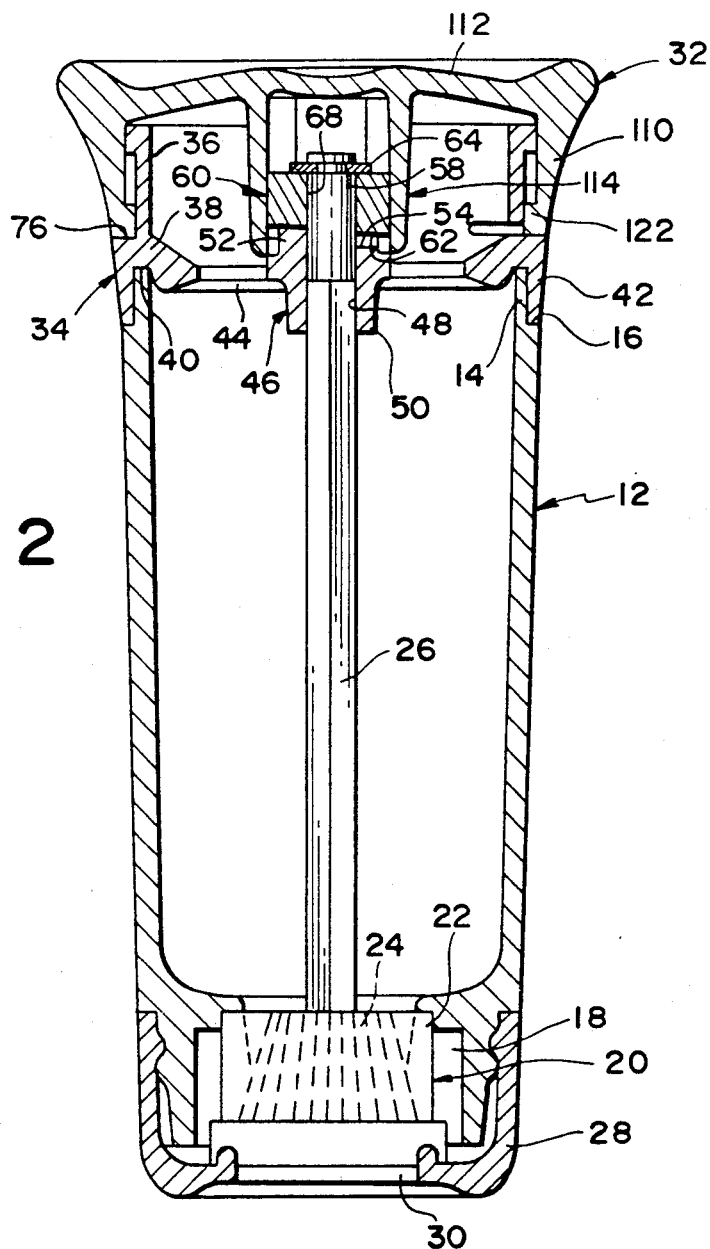
FIG. 2 an enlarged vertical cross-sectional view through the grinder.
Figure 7:
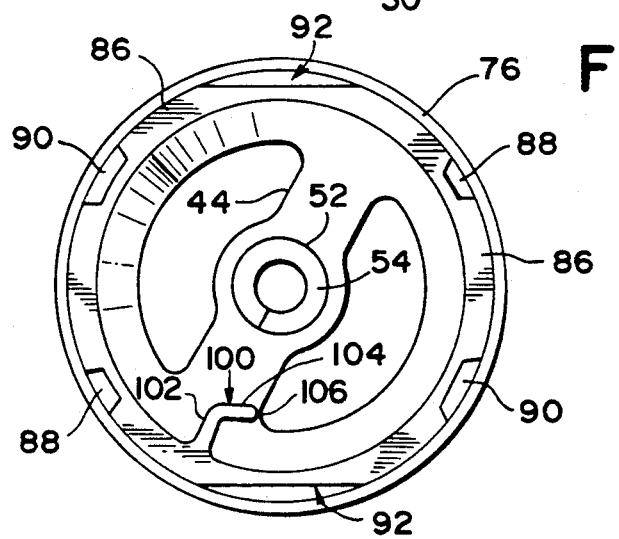
FIG. 7 is a top plan view of the positioning ring.
Figure 3:
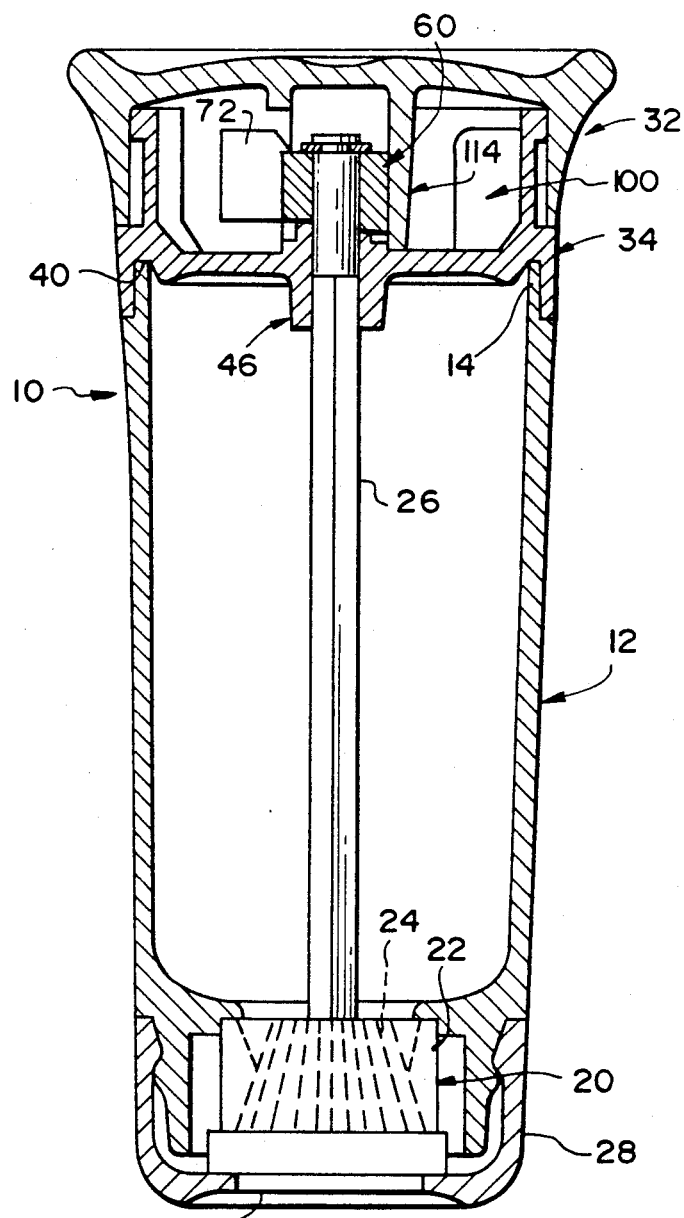
FIG. 3 is a vertical cross-sectional view taken at generally right angles to FIG. 2.
Figure 8:
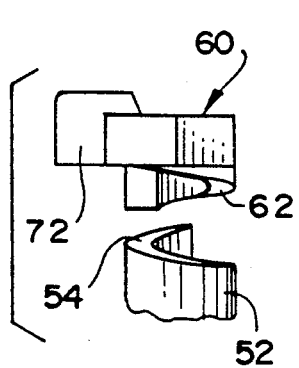
FIG. 8 is an exploded perspective view of the adjustment nut and the upper end of the positioning ring collar illustrating the cooperating camming surfaces.
Figure 9:
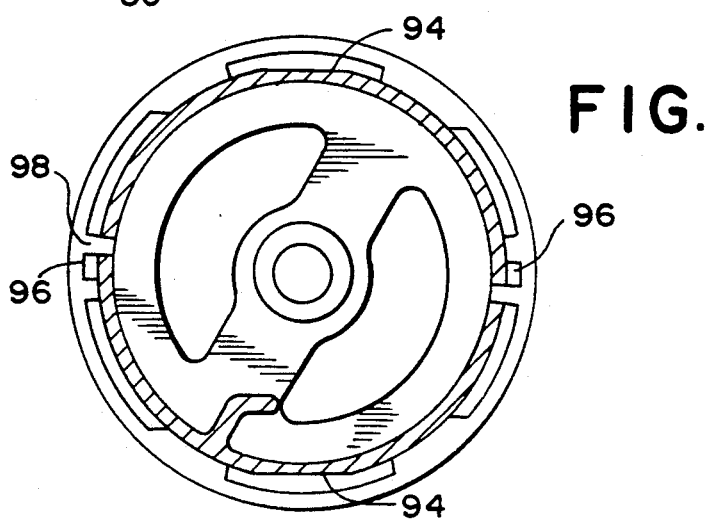
FIG. 9 is a horizontal cross-sectional view taken through the positioning ring substantially on line 9—9 in FIG. 5.

Referring now more specifically to the drawings, the condiment grinder 10 will normally be of a vertically elongate cylindrical configuration with the body thereof formed by a vertically elongate hollow cylindrical container 12. The container 12 has an open upper end or mouth defined by a vertical lip 14 formed as an integral continuation of the cylindrical wall of the container 12. An upwardly directed shoulder 16 is defined immediately outward of the lip 14 peripherally about the container wall. The lower end of the container 12 has a grinding chamber 18 formed therein and opening both upwardly and downwardly. This chamber 18 receives the grinding mechanism 20. The grinding mechanism is of conventional construction and basically includes an outer shell 22 and an inner grinding head 24 mounted to and manipulated by a vertically extending central bar or shaft 26.

The grinding chamber 18 is enclosed by a bottom cap 28 which snap mounts or is otherwise releasably affixed to the lower portion of the container 12 and, for aesthetic reasons, presents an exterior surface which is a smooth continuation of the exterior surface of the wall of the container 12. The bottom cap, as appropriate, will include a bottom discharge opening 30 and, as may be required by the particular grinding mechanism utilized, can assist in the positioning and retention of the grinding mechanism.

The grinding mechanism 20, as in a conventional pepper grinder or the like, grinds and dispenses the condiment by a relative rotation of the grinding components 22 and 24 through a rotation of the central shaft 26. This is normally effected by a control handle or knob mounted to the upper portion of the shaft.

The grinding mechanism 20 is also adjustable to vary the coarseness of the grind by a vertical adjustment of the grinding components 22 and 24 relative to each other. This vertical adjustment is normally achieved through the central shaft by means of a finely threaded nut at the upper end thereof which is exposed and directly manually and engaged and manipulated independently of the grinding handle or knob.

In the present invention, both the coarseness adjustment and the grinding manipulation of the grinding mechanism 20 are effected by rotation of a single control cover or knob 32. The control knob 32 mounts to and is adjustable relative to a positioning ring 34 in a manner which shall be explained subsequently.

The positioning ring 34 includes an annular vertically elongate wall 36 extending upwardly from a base portion 38 which includes a downwardly directed annular groove 40 complementary to and receiving the upwardly directed container lip 14. The base 38, immediately outward of the angularly downwardly directed recess 40, includes a depending skirt 42, the lower edge of which seats on the shoulder 16 and the outer surface of which is generally coextensive with the outer surface of the container 12 to provide a smooth continuation thereof. The engagement of the container lip 14 within the ring groove 40 is such whereby rotation of the ring 34 relative to the container 12 is possible with the nature of the materials used providing for a generally friction free rotation.

The base portion 38 of the positioning ring 34 further includes a support spider 44, for example in the nature of a pair of diametrically aligned integral spokes which extend from the annular ring wall 36 to a central collar 46. The collar 46 includes a central bore 48 therethrough of a polygonal, preferably square, cross-section. The collar 46, defines a depending boss 50 below the spider 44 and an upwardly directed boss 52 above the spider 44. The upper boss 52 terminates in a wide helical upper edge 54 forming a high pitch cam surface.

The central shaft 26 is of a polygonal cross-section, from the grinding mechanism 20 to approximately mid-height within the collar 46. The bore 48 in the collar is complementary to and closely and non-rotatably receives the shaft 26 whereby rotation of the ring 34 will produce a corresponding rotation of the central shaft 26 and a rotational activation of the grinding operation of the grinding mechanism 20. The central shaft 26, vertically through the upper portion of the collar 46 and therebeyond is cylindrical, this cylindrical portion being designated by reference numeral 58.

An adjustment nut 60 is rotatably received about the cylindrical upper portion 58 of the central shaft 26 and includes a downwardly directed helical lower face 62 defining a high pitch cam follower which engages and mates with the upwardly directed cam surface 54. The adjustment nut 60 is retained on the shaft portion 58 with the cam follower 62 engaged with the cam surface 54 by a retaining clip 64 snap locked within an annular groove in the shaft 26 immediately above the nut 60 and in downwardly directed bearing engagement with the nut 60. With such an arrangement, rotation of the nut 60 about the cylindrical upper shaft portion 48 will, through the engaged high pitch camming surfaces, effect a vertical adjustment of the central shaft 26 and hence a vertical adjustment of the inner grinding head 24 of the grinding mechanism 20 to achieve the desired coarseness adjustment. As will be appreciated, the actual adjustment will involve a positive raising of the shaft 26 through the engaged surfaces 54 and 62, and a corresponding lowering of the shaft 26, upon an appropriate rotation of the nut 60, principally through the weight of the inner grinding element 24, as in a conventional pepper grinder or the like.

The pitch of the cam assembly is such whereby the full range of coarseness adjustment is effected through a total revolution of the adjustment nut of no more than 360°. This clearly differs from the conventional adjustment nut normally threaded directly to the central shaft and, because of the low pitch threading, requiring multiple revolutions to achieve the full range of adjustment. This in turn makes it extremely difficult to obtain an accurate indication of the actual coarseness of the grind without trial-and-error experimentation.

The central bore 68 through the nut 60 is cylindrical and smooth surfaced to allow for free rotation of the adjustment nut 60 about the cylindrical upper portion 58 of the shaft 26 as above described. The nut 60 itself, as defined by the outer periphery thereof, is of a polygonal configuration, preferably generally hexagonal, and includes an integral flange or extension 72 extending outwardly therefrom parallel to and immediately adjacent a diametric centerline of the nut 60 with one vertical face of the extension 72 being in a plane on said diametric centerline.

Referring again to the positioning ring 34, the upstanding annular wall 36 thereof is externally configured to cooperate with the telescopically overlying control cover or knob 32. More specifically, the wall 36 is surrounded by an annular upwardly directed shoulder 76 above the groove 40 which receives the container flange 14. A series of integrally formed blocks 78 extend upwardly from the shoulder 76, inward of the outer periphery thereof, and define a series of substantially equal size locking recesses 80 therebetween. The recesses 80 open upwardly into a continuous annular groove 82 completely about the exterior of the positioning ring wall 36. The upper corners 84 of the blocks leading into the recesses 80 can be chamfered.

An upper series of blocks 86 are integrally formed peripherally about the outer surface of the ring wall 36 and define the upper extremity of the central groove 82. The upper blocks 86 are spaced and define six release passages extending vertically between the annular groove 82 and the upper end of the positioning ring 34. These passages are generally rotationally offset so as to lie intermediate the six lower locking recesses 80. The release passages comprise a first pair of diametrically opposed narrow passages 88, a second pair of diametrically opposed substantially wider release passages 90, and a third pair of diametrically opposed passages 92 which are at least as wide as the passages 90. The last mentioned passages 92 are formed as flats or flat areas which not only define the corresponding passages 92 but also provide for a relatively narrower land 94 vertically across the annular groove 82 immediately therebelow.

Referring again to the lower locking recesses 80, a diametrically opposed pair of these recesses, on a diameter generally perpendicular to the diameter of the flats 92, each includes a projecting locking lug 96 toward the upper end of the corresponding locking recess 80 and vertically spaced above the annular upwardly directed shoulder 76. These lugs 96, as shall be explained subsequently, are adapted to releasably snap-lock the control cover or knob in its first stage or position relative to the positioning ring 34. As such, a degree of flexure is desired in the wall 36 of the positioning ring 34 adjacent each lug 96. This degree of flexure is provided by a right angle slot 98 through the wall 36 adjacent each lug 96. Each slot 98 includes a vertical leg extending immediately adjacent the corresponding lug 96 and a horizontal leg extending below the lug 96 and immediately above the shoulder 76, providing in effect a right angular wall section capable of an inherent slight degree of flexure which does not affect the structural integrity of the positioning ring.

The positioning ring is completed by an abutment flange 100 integral with the inner face of the retaining ring wall 36 and extending radially inward thereof approximately 30° offset from one of the flats 92 and defining an abutment face 102. The radial inner portion of the abutment flange 100 is laterally angled as at 104 and defines an abutment edge 106 angularly offset from the abutment face 102.

The control cover or knob 32 includes a peripheral wall 110 which, upon a mounting of the cover 32 on the positioning ring 34, encircles the ring wall 36. The control knob 32 also includes an integral top panel 112 which overlies the ring 34 and the open upper end of the container 12.

A sleeve 114 is integrally formed with the top panel 112 and depends centrally therefrom to a point immediately above the positioning ring spider 44 upon a full seating of the control knob. The sleeve 114 is of a polygonal cross-section complementary to that of the adjustment nut 60 for a free sliding and non-rotational vertical engagement about the nut 60. So engaged, the sleeve 114, and hence the control knob 32 itself, is vertically adjustable relative to the nut and in rotational driving engagement therewith in the vertically adjusted positions.

The depending sleeve 114 includes a generally radially extending alignment flange or extension 116 which, upon an appropriate positioning and alignment of the control knob, in a manner which shall be explained subsequently, the sleeve flange 116 seats against the nut alignment flange or extension 72, providing in effect a rotational limit for the control knob and nut as it selectively engages against the abutment flange 100 on the positioning ring 34.

The inner surface of the control knob wall 110, immediately above the lower edge thereof, includes six integrally formed lugs thereon and projecting inwardly therefrom. The lugs, arranged in opposed pairs, comprise a first pair of relatively narrow lugs 120 adapted to align with and engage through the upper passages 88 on the outer surface of the positioning ring wall 36, a second pair of larger lugs 122 adapted to align with and pass through upper passages 90 on the positioning ring wall 36, and a third pair of lugs 124 of approximately equal width with the lugs 122 and adapted to align with the passages defined by the flats 92 on the positioning ring wall 36. The lugs 122 and 124 cannot be accommodated in the relatively narrower passages 88.

Figure 11:
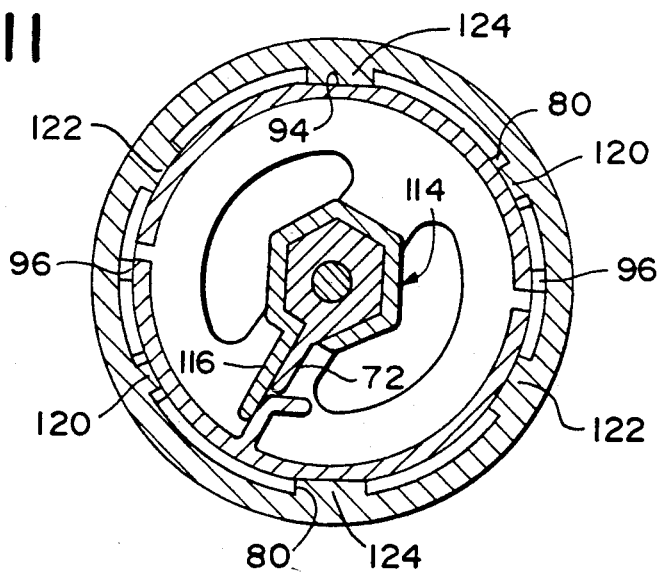
FIGS. 11, 12 and 13 are horizontal cross-sectional views illustrating selected rotatably adjusted positions of the control knob and adjustment nut relative to the positioning ring.
Figure 12:
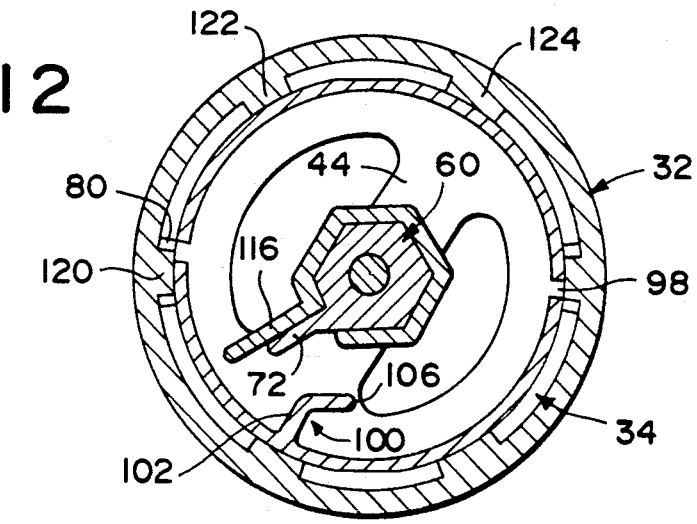

As will be noted from the drawings, the sleeve 114 depending from the top panel 112 of the control knob 32 extends below the peripheral lower edge of the control knob wall 110, and as such, proper alignment with the adjustment nut 60 can be easily visually verified. Further, and as noted in the cross-sectional views of FIGS. 11 and 12, while the nut 60 and sleeve 114 are of generally hexagonal configuration, the slight irregularity of both cross-sections, due to the projecting flanges 72 and 116, allow for an alignment in only one position wherein the flanges 72 and 116 engage and define a common stop or limit arm.

With the control knob sleeve initially aligned and engaged with the nut 60, the control knob, and nut, are rotated to properly align the control knob lugs 120, 122 and 124 with the corresponding passages 88, 90 and 92. This alignment is preferably effected by positioning marks or indicia 130 and 132 respectively on the outer surface of the positioning ring 34 and the control knob wall 110. When so aligned, the lugs will engage through the corresponding passages and move into the annular groove 82 and into seated engagement on the upper edges of the lower blocks 78 of the positioning ring 34. Further, when so aligned, the combined abutment or rotation limiting flanges 72 and 116 of the adjustment nut and cover sleeve 116 will be at one extreme position thereof in engagement with the abutment flange or stop 100 projecting radially inward from the inner surface of the positioning ring 34, note FIG. 11.

Figure 13:
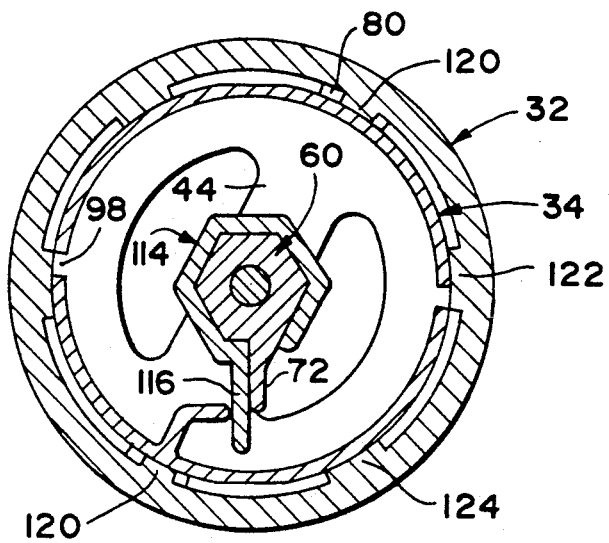
Figure 14:
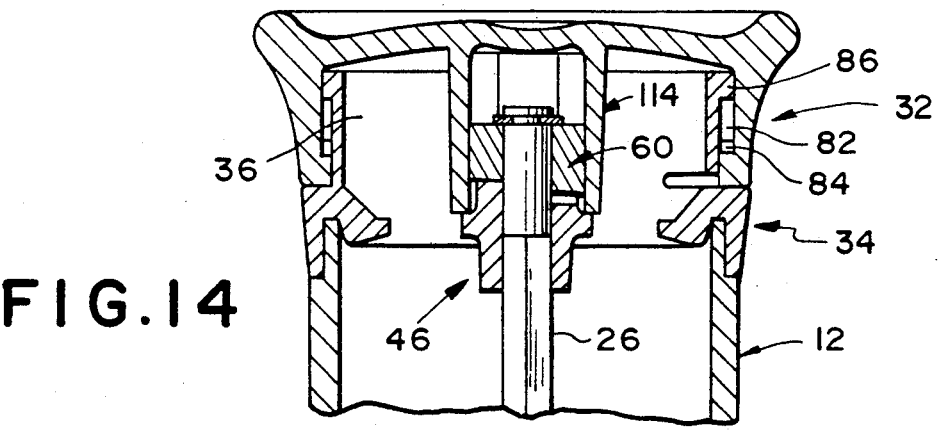
FIG. 14 illustrates, in cross-section, the control knob fully seated on the positioning ring for rotational control of the positioning ring.
Figure 15:
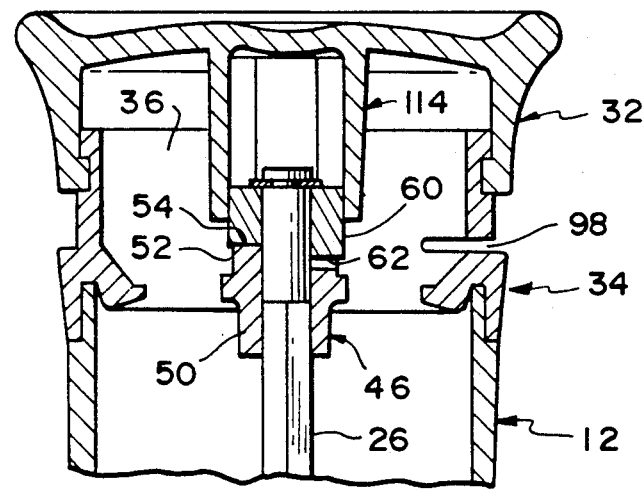
FIG. 15 is a view similar to FIG. 14 with the control knob upwardly adjusted for free rotational adjustment relative to the positioning ring.
Figure 16:
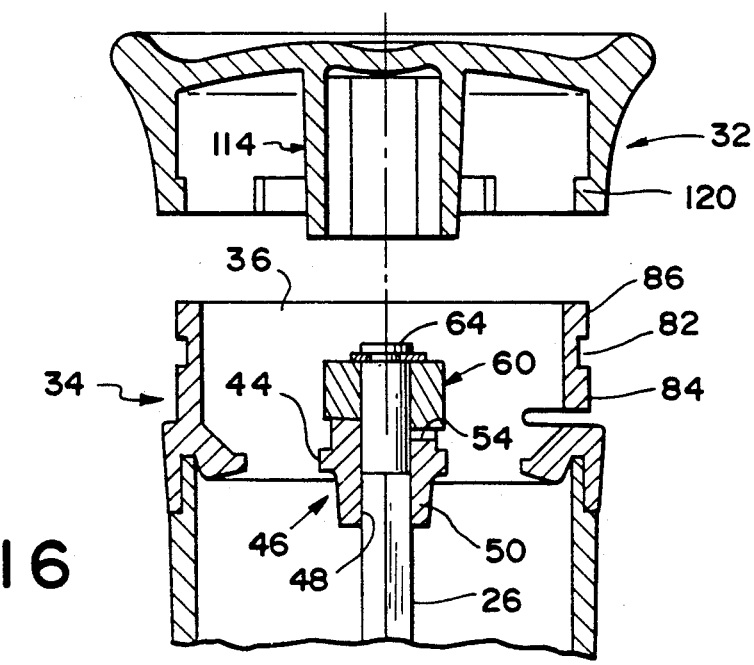
FIG. 16 is an exploded cross-sectional view of the knob removed from the positioning ring.

So mounted, and with the control knob lugs free to travel within the positioning ring groove 82, the control knob 32 rotates relative to the ring 34. At the same time, the control knob sleeve 114 is in engagement with the adjustment nut 60 and effects a rotation of this nut relative to the positioning ring. This in turn, through the engaged camming surfaces 54 and 62, effects a vertical adjustment of the central shaft 26 and an adjustment of the grinding mechanism 20 to vary the coarseness of the grind. The complete adjustment, through the high pitch of the camming surfaces, is effected through less than a complete 360° revolution of the control knob 32 with the extreme positions being limited by the positioning ring stop 100 and the flange 116 of the sleeve 114 engaging against the stop abutment surface 102 and stop abutment edge 106 as will be best noted in FIGS. 11 and 13.

Six positions or coarseness grades are contemplated and visually designated by indicia or markers 134 at points about the outer surface of the control knob wall 110 for alignment with the positioning ring marker 130. As suggested in the drawings, the size of the markers 134 can progressively change to provide an immediate indication of the coarseness involved. Further, by effecting the full range of adjustment to less than a complete revolution, or at least no greater than 360°, visual or tactile indicia or markers can be utilized to note the exact coarseness of the grind. The multiple revolutions required for a full range of grind adjustment commonly found in conventional grinders allows for no practical means for providing an indication of coarseness without an actual dispensing of the condiment in that no ready means is available for determining which or how many revolutions have been effected during adjustment. Similarly, the conventional grinder provides no means for indicating the coarseness at which the mechanism is set by merely looking at the grinder.

Upon a rotational setting of the control knob 32, through the aligned markers or indicia, at the desired coarseness, the lugs will be aligned over respective ones of the lower locking recesses 80 of the positioning ring 32. In order to now effect the desired grinding and dispensing, the control knob 32 is pushed downward to engage the lugs thereon within the locking recesses 80 and between the adjacent blocks 78.

The pair of control knob lugs which align with the locking recesses 80 incorporating the locking lugs 96, snap lock below the lugs 96, through a slight degree of flexure introduced into the positioning ring wall 36 by the wall slots 98. As will be appreciated, the height of the control knob lugs are such as to engage within the appropriate locking recesses 80 below the snap lugs 96. When so seated, rotation of the control knob 32 will, through an engagement of the lugs with the blocks 78 to each side of the locking recesses 80, effect a corresponding rotation of the positioning ring and, through the keyed engagement of the ring collar 46 with the central shaft 26, a rotation of the shaft 26 and a grinding manipulation of the grinding mechanism 20 to both grind and dispense the condiment. At the same time, the adjustment nut 60, engaged by the control knob sleeve 114 is rotated with the positioning ring 34, and not relative thereto. As such, the vertical position of the central shaft 26 is maintained and the set coarseness of the grind remains the same throughout the grinding and dispensing operation.

When it is desired to adjust the coarseness of the grind, the control knob 32 is raised relative to the positioning ring 34 with the control knob lugs snap-releasing from the positioning ring snap lugs 96 and moving upward into the adjustment groove 82. Upward movement into the groove 82 is limited by engagement of the control knob lugs with the overlying upper blocks 86. This upward movement of the control knob, and in particular the release from the snap lugs 96 is readily effected with the positioning ring 34 retained against vertical movement by the retaining clip 64 fixed to the central shaft 26 and bearing against the adjustment nut 60 which in turn bears against the central sleeve of the positioning ring 34.

When the control knob 32 is to be completely removed, for example so as to allow for a refilling of the container 12 through the open support spider 44 of the positioning ring 34, the knob lugs are aligned with the corresponding upper passages, by an alignment of the markers 130 and 132, and a vertical withdrawal of the control cover or knob is effected.

Referring again to the opposed flats 92, and more particularly the land portions 94 thereof within the adjustment groove 82 about the exterior of the positioning ring wall 36, such lands are intended to provide a physically sensed positioning stop as the knob is aligned for removal. More particularly, as the control knob is rotated to align the indicia 130 and 132 there will be a physical sensing of the engagement of the lugs 124 within the land areas and a resistance to continued rotation therebeyond. This resistance is minimal and, while serving as a positioning and retention means until the control knob is removed, does not interfere with the rotational adjustment of the knob relative to the positioning ring.

As will be recognized from the foregoing detailed description of the invention, the entire operation of the grinder, including the adjustment of the coarseness of the grind, and the actual grinding and dispensing of the condiment is effected utilizing a single control knob. The adjustment nut for varying the coarseness is concealed at all times, including during manipulation thereof. The control knob is also in the nature of a closure or cover for the container portion of the grinder and which, again solely through manipulation of the control knob, is completely removable to allow filling of the container.

The foregoing is considered illustrative of the principles of the invention, and as other embodiments or modifications may occur to those skilled in the art, it is not desired to limit the invention to the exact construction and manner of operation shown and described. Rather, all suitable modifications and equivalents, as fall within the scope of the claims, are to be considered within the scope of the invention.

We claim:

1. In a condiment grinder including a container from which the condiment is to be dispensed, a grinding mechanism mounted to the container for the grinding and dispensing of condiment therefrom, and an elongate control shaft engaged with said grinding mechanism and extending longitudinally through said container, said control shaft being rotatable and effecting a rotational driving of said grinding mechanism to effect the grinding and dispensing, said control shaft being axially adjustable to effect an adjustment of said grinding mechanism to vary the coarseness of the grind; the improvement comprising a single control knob mounted to said container for rotation relative thereto about an axis defined by said control shaft, and axially adjustable between first and second positions relative to said container and shaft, rotation means between said knob and said shaft in said first position for rotatably driving said shaft in response to rotation of said knob, and adjustment means engaged between said shaft and said knob in said second position for axial adjustment of said shaft in response to rotation of said knob.

2. The condiment grinder of claim 1 wherein said control knob is externally accessible on said container and manually manipulable for both rotation and adjustment, said adjustment means being concealed by said knob in both said first and second positions of said knob.

3. The condiment grinder of claim 2 wherein said container includes an open mouth through which said control shaft projects, said mouth being defined by an annular lip thereabout, said rotation means comprising a positioning ring mounted to said lip and rotatable thereon about said container mouth, said ring including a central bore receiving said control shaft longitudinally therethrough, said control shaft being axially slidable within said bore, said bore and said shaft being complementarily configured to preclude relative rotation therebetween while allowing for said axial sliding movement whereby rotation of said ring will effect a corresponding rotation of said shaft, said knob engaging said ring and being axially adjustable thereon relative to the axis of rotation between said first and second positions, and complementary means on said control knob and said ring engaging each other in said first position for rotatably locking said control knob to said ring for rotation of said ring upon rotation of said knob, said complementary means on said knob and said ring disengaging in said second position of said knob for allowing rotation of said knob independently of said ring in said second position.

4. The condiment grinder of claim 3 wherein said adjustment means comprises an adjustment nut rotatably received about said shaft and retained against longitudinal movement on and relative to said shaft outward of said ring, and complementary engaged camming surfaces on said adjustment nut and said ring whereby rotation of said nut about said shaft relative to said ring will effect an axial movement of said control shaft, said control knob in said second position being in rotationally driving engagement with said adjustment nut and free to rotate relative to said ring for adjustment of said nut independently of said ring.

5. The condiment grinder of claim 4 wherein said ring includes a central collar supported by spider means defining openings for the introduction of condiment, said collar including said shaft-receiving bore therethrough, said collar including an upper surface upon which said adjustment nut seats, said nut including a lower surface, said collar upper surface and said nut lower surface defining said camming surfaces.

6. The condiment grinder of claim 5 wherein said ring includes an annular wall with an outer surface, said control knob comprising an annular wall telescopically receivable over and about said ring wall, said ring wall having an annular groove at approximately mid-height in the outer surface thereof, said knob wall having a series of peripherally spaced inwardly projecting lugs thereon engageable and rotationally slidable within said groove in said second position of said knob for rotation of said knob independently of said ring, said ring, below said groove in the outer surface of the wall thereof, including blocks spaced peripherally thereabout and defining recesses therebetween equal in number and spacing to said lugs on said control knob, said lugs, in said first position of said control knob engaging in said recesses and being retained against rotation relative to said ring by said recess-defining blocks whereby rotation of said knob effects a simultaneous rotation of said ring which in turn produces rotation of said control shaft.

7. The condiment grinder of claim 6 wherein said knob includes a central panel overlying said control shaft and adjustment nut thereon, a sleeve depending from said central panel and telescopically engageable over said adjustment nut, said sleeve and adjustment nut having complementary surfaces allowing for axial adjustment therebetween while precluding relative rotation in each of said first and second positions of said control knob whereby rotation of said control knob in said first position effects simultaneous rotation of said ring and said adjustment nut and precludes relative rotation therebetween, and whereby said control knob, in said second position, effects rotation of said adjustment nut relative to said ring.

8. The condiment grinder of claim 7 including snap lock means releasably retaining at least selected ones of said knob lugs within said locking recesses in said first position of said knob against axial withdrawal therefrom.

9. The condiment grinder of claim 8 wherein said outer surface of said ring wall includes release passages extending axially from said annular groove equal in number and spacing to said control knob lugs for selective alignment of said control knob lugs therewith for an axial removal of said control knob from said ring.

10. The condiment grinder of claim 9 wherein said annular groove in said outer surface of said ring wall includes position indicator means therein aligned with at least one release passage thereabove for physically engaging at least one of said control knob lugs and defining a physical indication of the alignment of said at least one lug with the corresponding release passage.

11. The condiment grinder of claim 5 wherein said knob includes a central panel overlying said control shaft and adjustment nut thereon, a sleeve depending from said central panel and telescopically engageable over said adjustment nut, said sleeve and adjustment nut having complementary surfaces allowing for axial adjustment therebetween while precluding relative rotation in each of said first and second positions of said control knob whereby rotation of said control knob in said first position effects simultaneous rotation of said ring and said adjustment nut and precludes relative rotation therebetween, and whereby said control knob, in said second position, effects rotation of said adjustment nut relative to said ring.

12. The condiment grinder of claim 3 wherein said ring includes an annular wall with an outer surface, said control knob comprising an annular wall telescopically receivable over and about said ring wall, said ring wall having an annular groove at approximately mid-height in the outer surface thereof, said knob wall having a series of peripherally spaced inwardly projecting lugs thereon engageable and rotationally slidable within said groove in said second position of said knob for rotation of said knob independently of said ring, said ring, below said groove in the outer surface of the wall thereof, including blocks spaced peripherally thereabout and defining recesses therebetween equal in number and spacing to said lugs on said control knob, said lugs, in said first position of said control knob engaging in said recesses and being retained against rotation relative to said ring by said recess defining blocks whereby rotation of said knob effects a simultaneous rotation of said ring which in turn produces rotation of said control shaft.

13. The condiment grinder of claim 12 including snap lock means releasably retaining at least selected ones of said knob lugs within said locking recesses in said first position of said knob against axial withdrawal therefrom.

14. In a condiment grinder comprising a container having a first dispensing end and a second opposed end, an adjustable grinding mechanism mounted at said dispensing end, said grinding mechanism being adjustable to define the coarseness of the grind to be dispensed and being rotatable to grind and dispense the condiment, and a control shaft extending from said grinding mechanism, the coarseness of the grind being adjusted upon axial adjustment of said shaft, and the condiment being ground and dispensed upon rotation of said shaft; the improvement comprising control means engaged with said control shaft for rotation and selective axial adjustment of said shaft, said control means including a rotatable control knob, a positioning member mounted on said container for rotation relative to said container, said shaft being engaged with said positioning member for rotation therewith and axial adjustment relative thereto, said control knob being adjustable relative to said positioning member between a first position in rotational driving engagement with said positioning member for a rotational driving of said shaft, and a second position rotatable relative to said positioning member, and adjustment means engaged between said knob and said shaft for axial adjustment of said shaft relative to said positioning member upon rotation of said adjustment means, said knob in said second position being adapted to rotate said adjustment means independently of said positioning member.

15. The condiment grinder of claim 14 wherein said adjustment means comprises an adjustment nut rotatably retained on said shaft against axial movement relative thereto, and cam means between said adjustment nut and said positioning member for axial movement of said shaft in response to rotation of said adjustment nut.

16. The condiment grinder of claim 15 wherein said positioning member comprises a positioning ring, said ring including an annular wall with an outer surface, said control knob comprising an annular wall telescopically receivable over and about said ring wall, said ring wall having an annular groove at approximately mid-height in the outer surface thereof, said knob wall having a series of peripherally spaced inwardly projecting lugs thereon engageable and rotationally slidable within said groove in said second position of said knob for rotation of said knob independently of said ring, said ring, below said groove in the outer surface of the wall thereof, including blocks spaced peripherally thereabout and defining recesses therebetween equal in number and spacing to said lugs on said control knob, said lugs, in said first position of said control knob engaging in said recesses and being retained against rotation relative to said ring by said recess-defining blocks whereby rotation of said knob effects a simultaneous rotation of said ring which in turn produces rotation of said control shaft.

17. The condiment grinder of claim 16 wherein said outer surface of said ring wall includes release passages extending axially from said annular groove equal in number and spacing to said control knob lugs for selective alignment of said control knob lugs therewith for an axial removal of said control knob from said ring.

18. In a condiment grinder including a container and a grinding mechanism mounted thereto for grinding and dispensing of condiment from said container, said grinding mechanism being rotatably driven to effect said grinding and dispensing, and adjustable to vary the coarseness of the grind; the improvement comprising a single control knob, means mounting said control knob on said container for adjustment between first and second positions thereon and for rotation relative to said container in each of said first and second positions, a first means engaged between said control knob and said grinding mechanism in said first position for rotational driving of said grinding mechanism for the grinding and dispensing of a condiment, said first means being disengaged in said second position, and second means between said knob and said grinding mechanism in said second position for adjustment of said grinding mechanism independently of the rotational driving of said grinding mechanism for varying the coarseness of the grind.

19. The condiment grinder of claim 18 wherein said second means engaged between said knob and said grinding mechanism for adjustment of said grinding mechanism is concealed by said knob in each of said first and second positions.

* * * * *